United States Patent
Hansson

Patent Number: 5,799,032
Date of Patent: Aug. 25, 1998

[54] LASER RESONATOR FOR AT LEAST TWO LASER MODES FROM AN OPTICALLY PUMPED LASER MEDIUM

[75] Inventor: Göran Hansson, Linköping, Sweden

[73] Assignee: Forsvarets Forskningsanstalt, Stockholm, Sweden

[21] Appl. No.: 765,204

[22] PCT Filed: Jul. 6, 1995

[86] PCT No.: PCT/SE95/00833
§ 371 Date: Jan. 3, 1997
§ 102(e) Date: Jan. 3, 1997

[87] PCT Pub. No.: WO96/01511
PCT Pub. Date: Jan. 18, 1996

[30] Foreign Application Priority Data
Jul. 6, 1994 [SE] Sweden .................. 9402386

[51] Int. Cl.$^6$ .................................. H01S 3/086
[52] U.S. Cl. .................. 372/99; 372/19; 372/32; 372/20
[58] Field of Search .................. 372/9, 12, 19, 372/20, 23, 29, 32, 92, 97, 99

[56] References Cited

U.S. PATENT DOCUMENTS

| | | |
|---|---|---|
| 3,482,186 | 12/1969 | Chernoch .................. 331/94.5 |
| 3,582,815 | 6/1971 | Siebert .................. 372/19 |
| 3,775,699 | 11/1973 | Cassels .................. 331/94.5 |
| 4,762,988 | 8/1988 | Strobel .................. 372/12 X |
| 4,930,131 | 5/1990 | Sizer, II .................. 372/18 |
| 4,930,133 | 5/1990 | Babbitt et al. .................. 372/32 |
| 5,056,101 | 10/1991 | Magill et al. .................. 372/32 |
| 5,151,908 | 9/1992 | Huber .................. 372/97 X |
| 5,172,383 | 12/1992 | Magill et al. .................. 372/32 |
| 5,331,651 | 7/1994 | Becker et al. .................. 372/32 |

FOREIGN PATENT DOCUMENTS 1 469 255  4/1977  United Kingdom.

Primary Examiner—John D. Lee
Attorney, Agent, or Firm—Jacobson, Price, Holman & Stern, PLLC

[57] ABSTRACT

The present invention relates to a resonator for at least two laser modes from an optically pumped laser medium, in which each laser mode is reflected between a highly-reflective mirror and an output mirror. The laser resonator feeds back and separates at least two longitudinal laser modes having a given stable frequency difference between the modes by the laser medium being adapted to emit the concerned number of laser modes which are arranged to pass a Fabry-Pérot etalon at different angles.

16 Claims, 7 Drawing Sheets

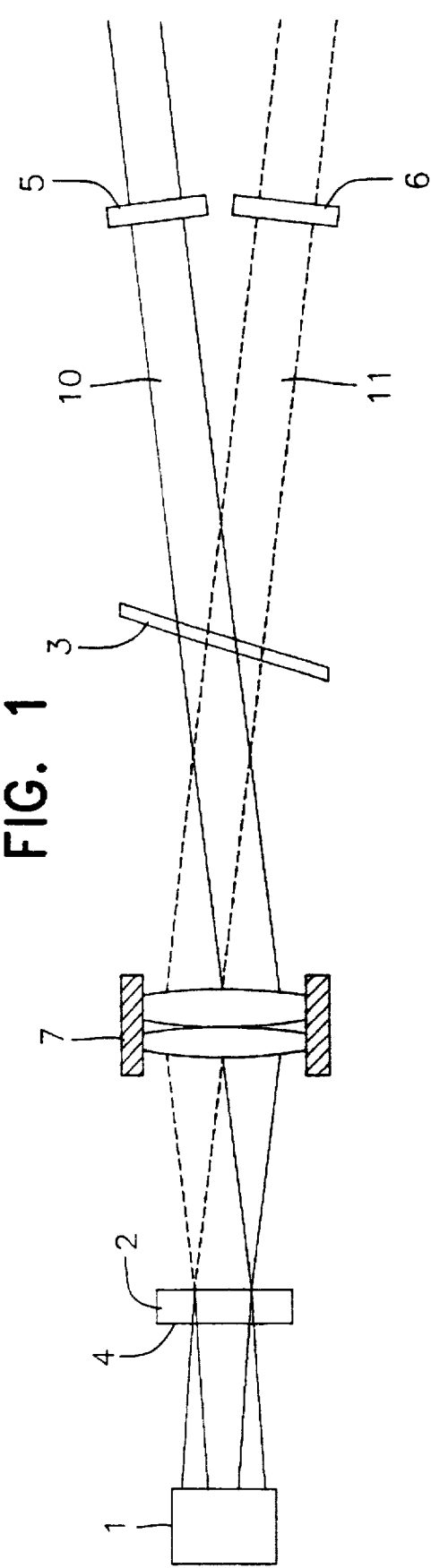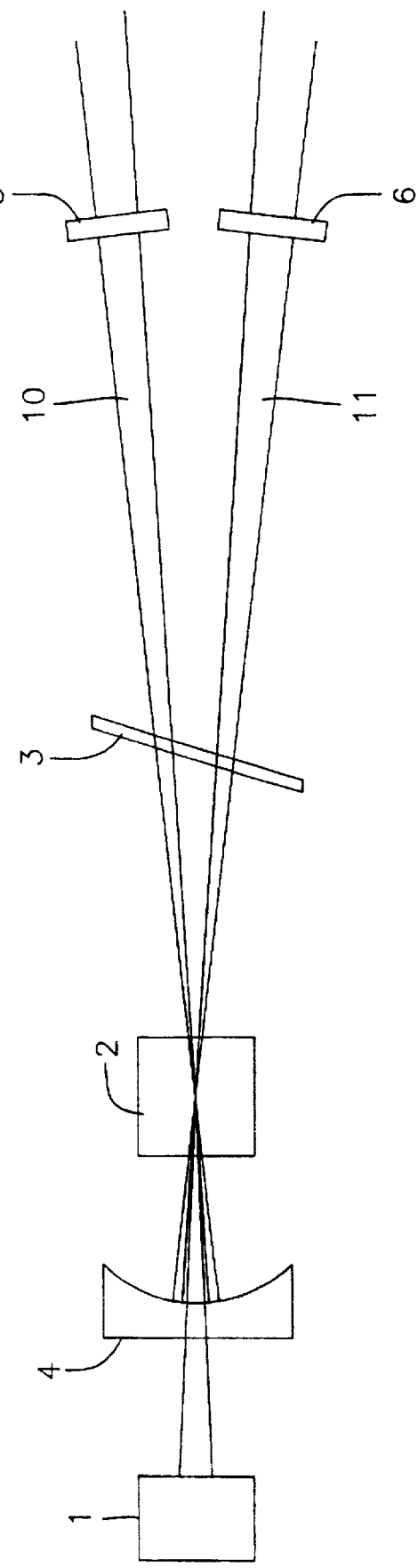

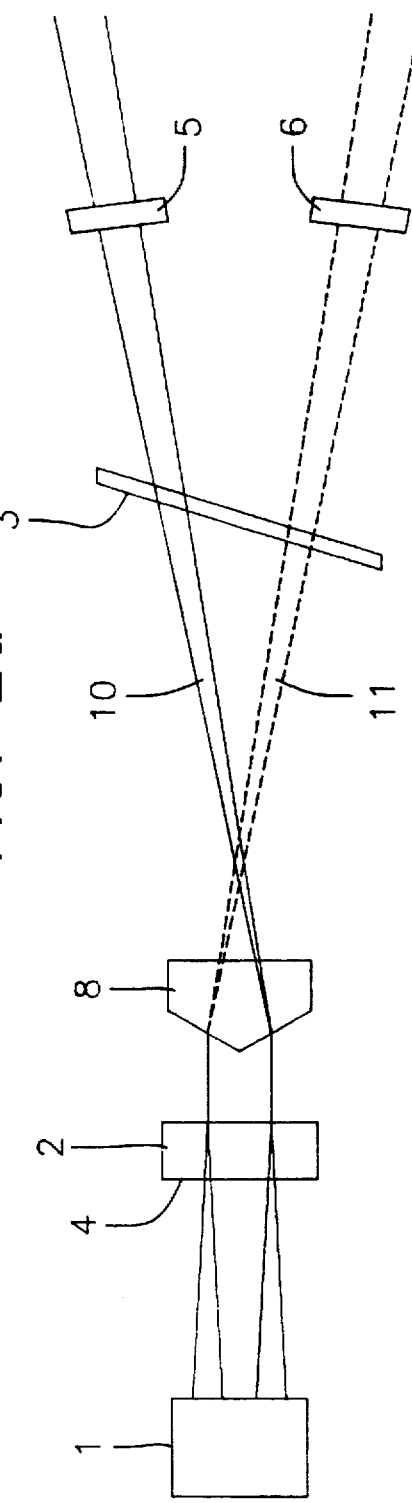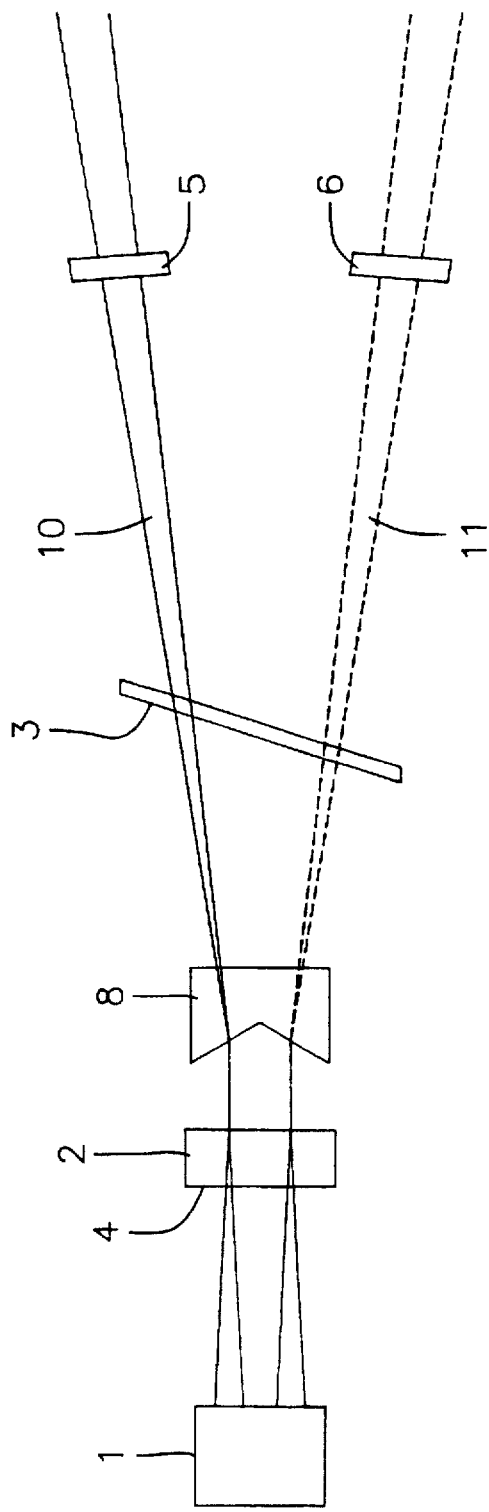

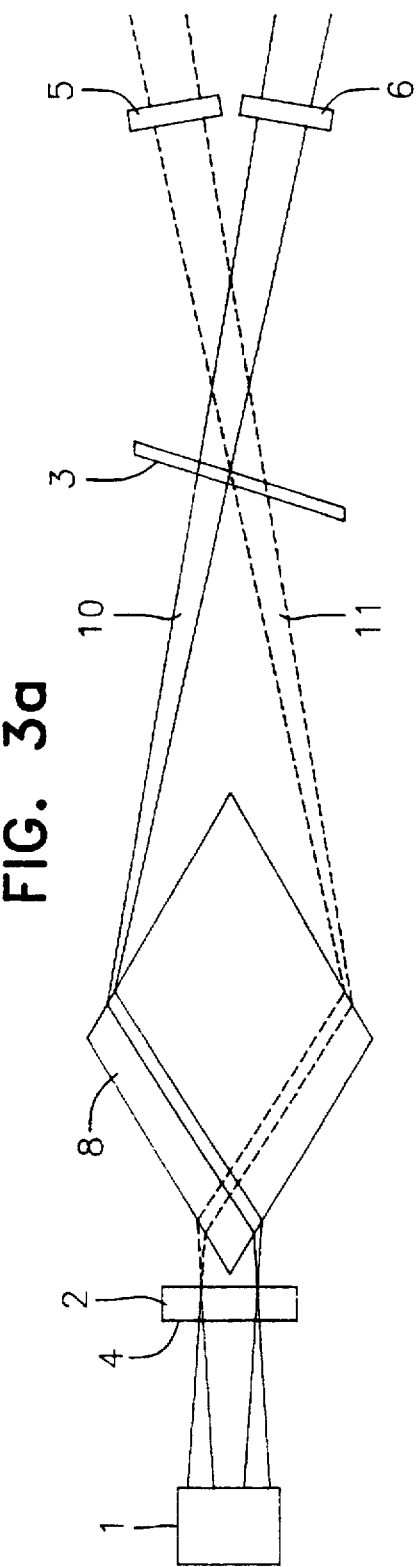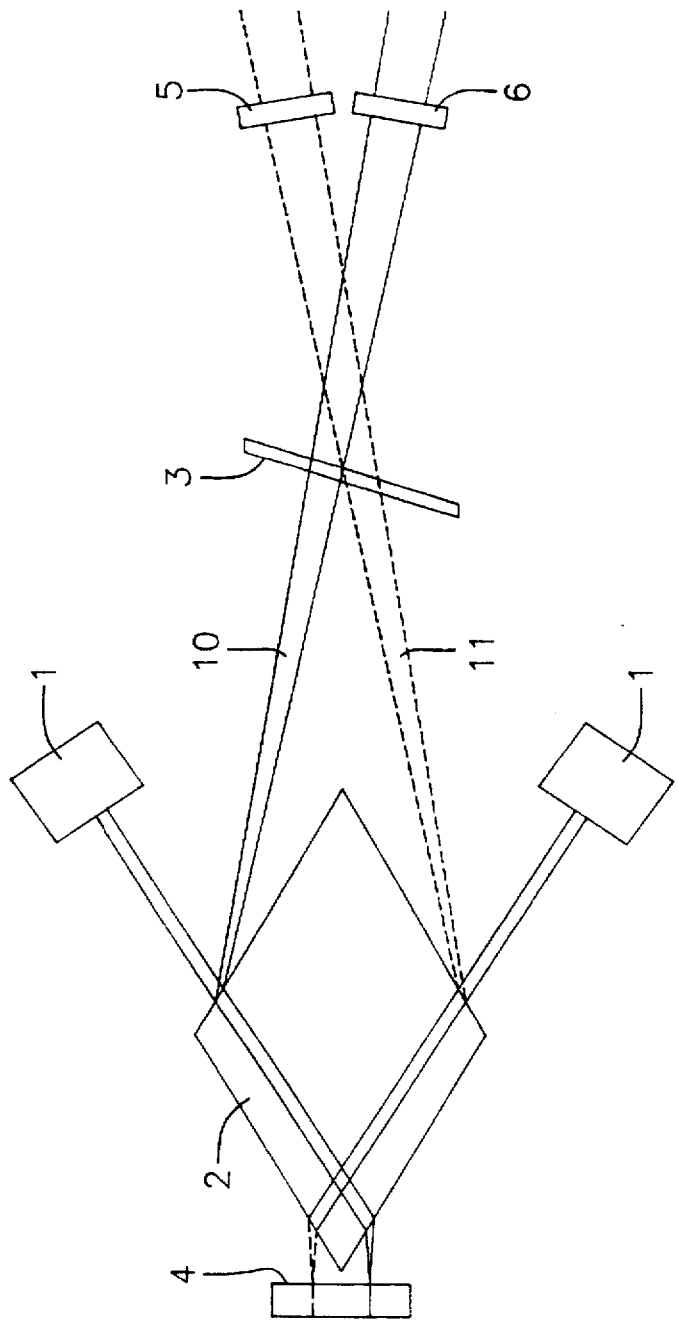

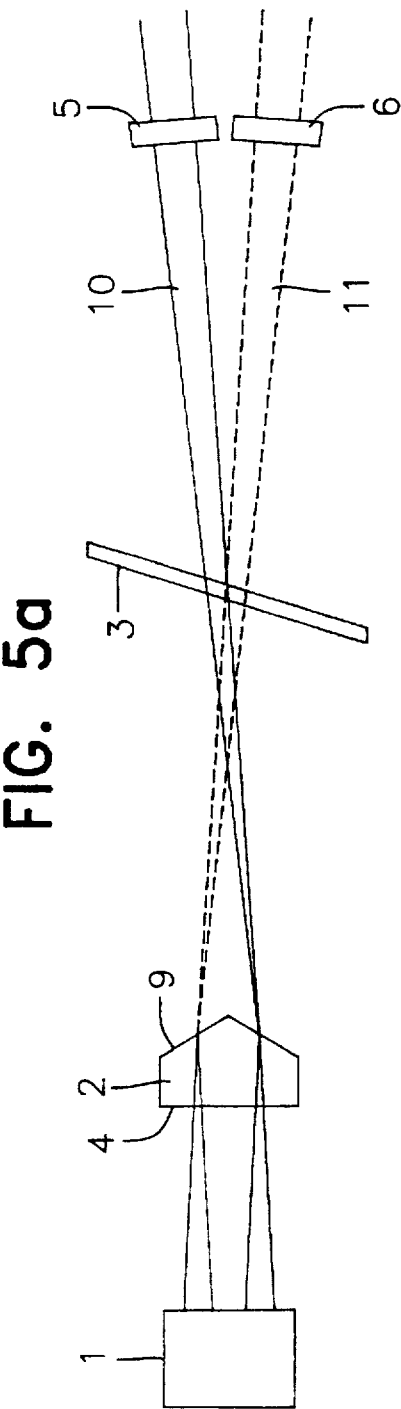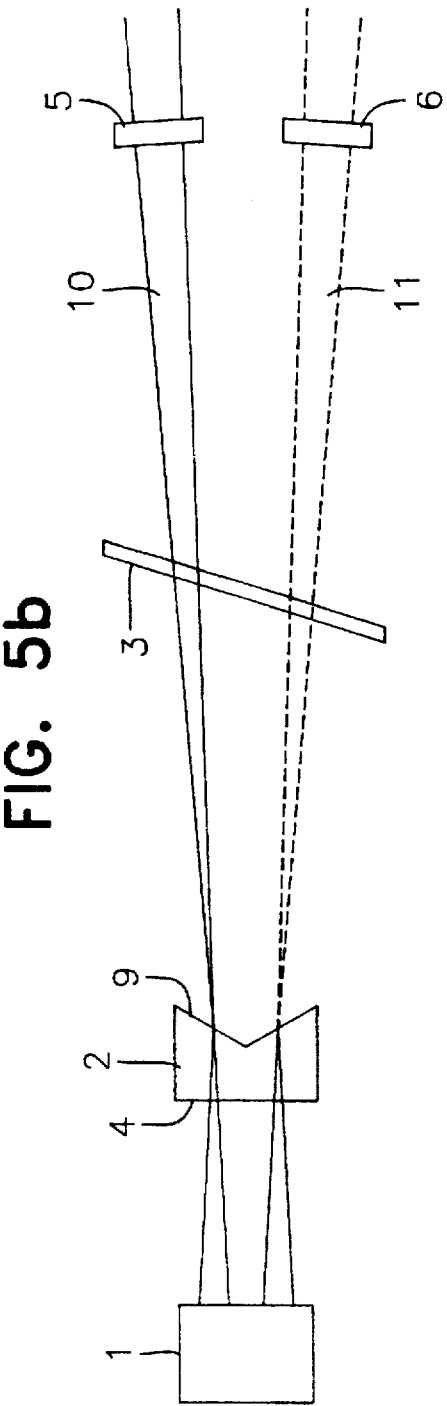

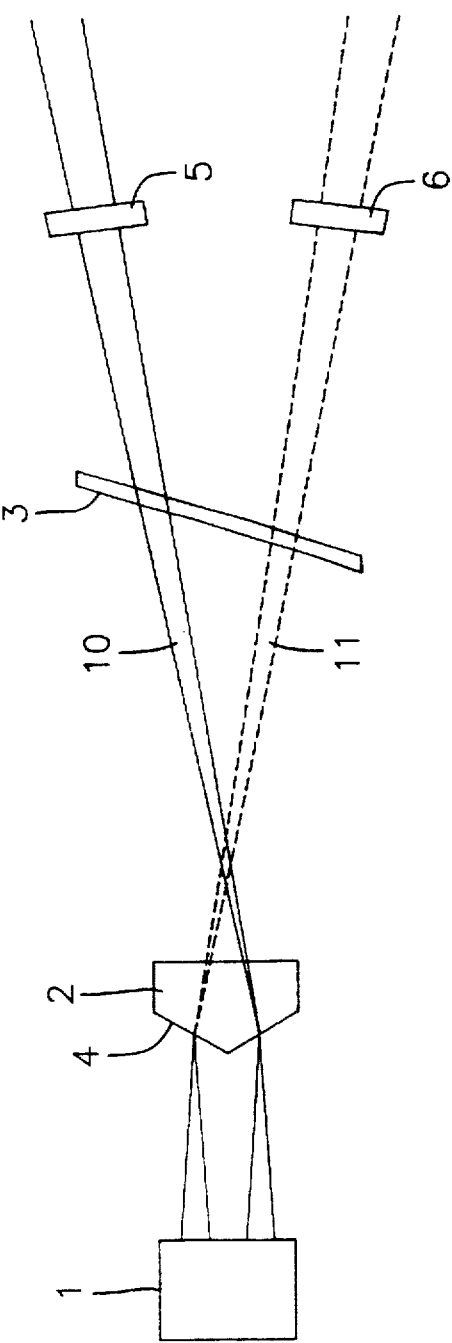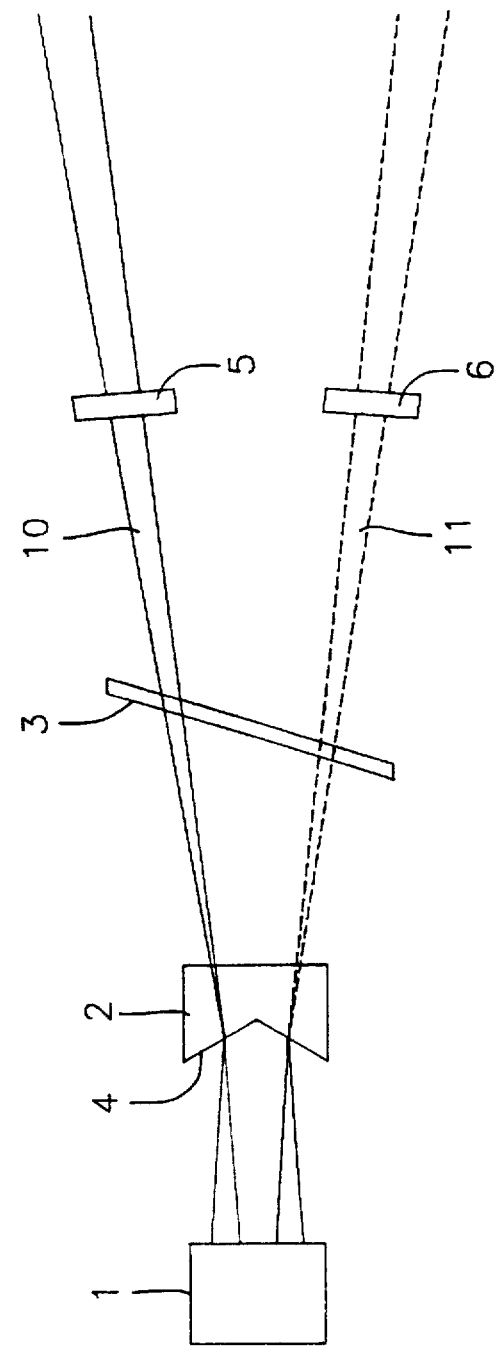

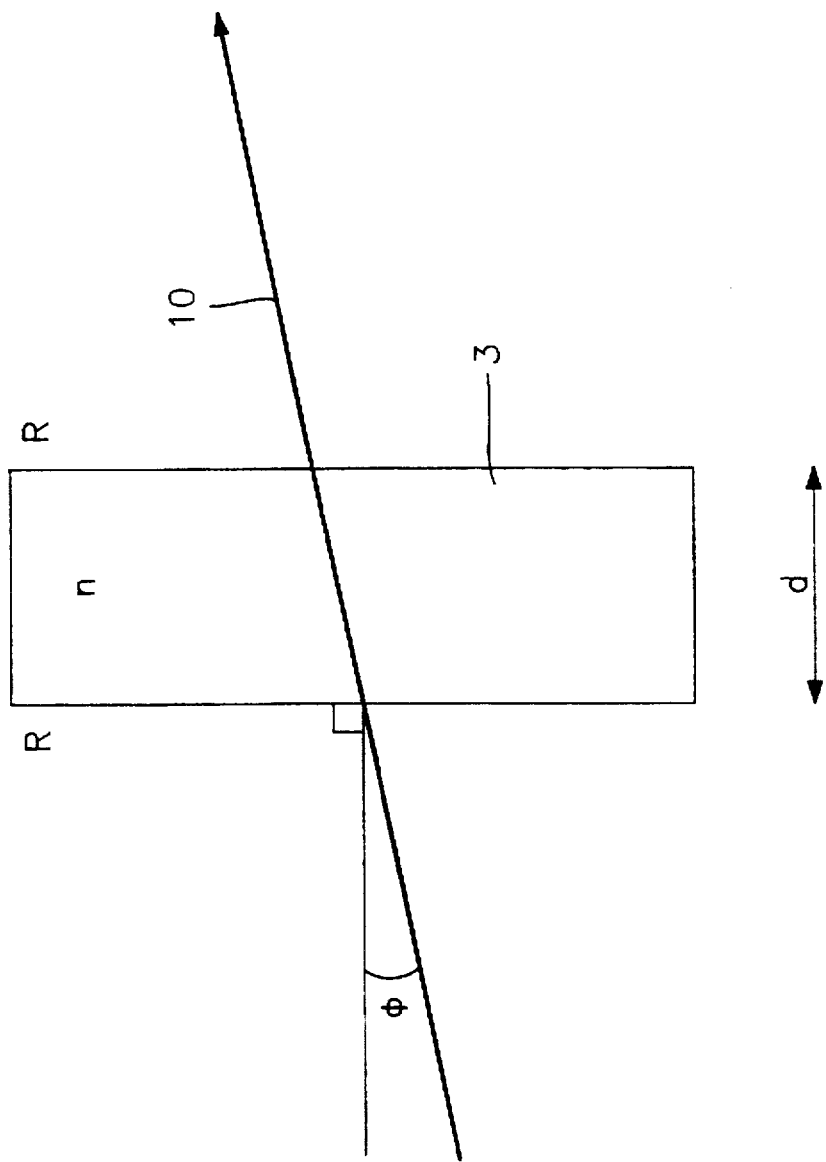

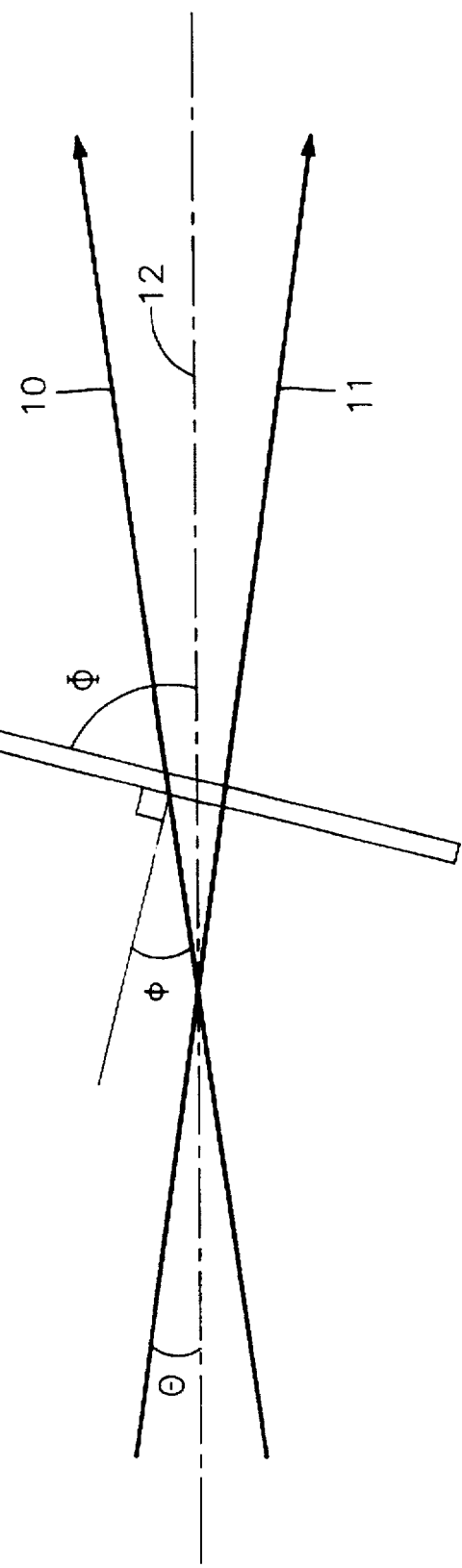

1

LASER RESONATOR FOR AT LEAST TWO LASER MODES FROM AN OPTICALLY PUMPED LASER MEDIUM

BACKGROUND OF THE INVENTION

1. Field of the Invention

The present invention relates to a laser resonator for at least two laser modes from an optically pumped laser medium.

2. Description of the Related Art

In a laser application, in which some sort of coherent detection is used, there is a need of a stable emitting laser and a local oscillator laser. For detecting Doppler shifts at a satisfactory signal-to-noise ratio, it is also necessary that the difference frequency between the radiation of the emitting laser and that of the local oscillator laser can be kept constant.

Although a laser is considered to be a light source having a minor spread in wavelength, it oscillates in most cases at a plurality of close frequencies at the same time. To make the laser generate radiation at one of these frequencies, use is mostly made of a frequency-discriminating element placed in the resonator. When a solid-state laser is involved, the frequency-discriminating element usually is a Fabry-Pérot (F-P) etalon.

A solid-state laser is a laser utilising a solid, such as a crystal, as laser medium. It is optically pumped by using a lamp or another laser, for instance a laser diode. The stability of a solid-state laser designed for single-frequency operation mostly depends on external factors, such as vibrations and variations in temperature and pump intensity.

If you need two or more laser beams having a given difference in oscillation frequency, it is necessary that they be affected in the same manner by external factors. This can be achieved by letting the different oscillators share the same components and surroundings as far as possible. This implies, for instance, that the mirrors included are supported by the same structure and, optionally, that use is made of the same laser medium for the different resonators.

SUMMARY OF THE INVENTION

However, it sill constitutes a problem to hold a constant difference in the oscillation frequency between different laser beams. The basic idea of the invention is to provide the desired constant difference in oscillation frequency between different laser modes by conducting these at different angles through an F-P etalon. The frequency that will oscillate in the resonator is determined by the angle of incidence of each laser mode to the etalon surface. This results in the desired constant difference frequency. When the laser is affected by external factors, these provide the same frequency shift in the different modes, but the frequency difference is kept constant. By changing the angle of the etalon relative to the main axis of the laser, the frequency difference can be adjusted.

BRIEF DESCRIPTION OF THE DRAWINGS

The invention will now be described in more detail with reference to the accompanying drawings in which FIGS. 1, 2a, 2b, 3a, 3b, 4, 5a, 5b, 6a, 6b illustrate various embodiments of laser resonators according to the invention, FIG. 7 shows the geometry of a Fabry-Pérot etalon, and FIG. 8 is a sketch of the angle of incidence of the laser modes to the etalon.

DETAILED DESCRIPTION OF THE PREFERRED EMBODIMENT

The basic idea of the invention is to provide the desired constant difference in oscillation frequency between different laser modes by conducting these at different angles through an F-P etalon. The frequency that will oscillate in the resonator is determined by the angle of incidence of each laser mode to the etalon surface. This results in the desired constant difference frequency. When the laser is affected by external factors, these provide the same frequency shift in the different modes, but the frequency difference is kept constant. By changing the angle of the etalon relative to the main axis of the laser, the difference frequency can be adjusted.

The geometry of the laser resonator can be arranged in a number of different ways. It is possible to use different shapes of the laser mirrors and the surfaces of the laser medium. It is also possible to arrange an optically refractive element in the resonator between the laser medium and the etalon.

FIG. 1 shows an embodiment of the invention with a set of lenses in the resonator. The laser medium 2 is pumped by using a laser diode 1 whose beam has been divided by means of beam-splitting optics or fibre-coupling into two identical parallel beams which are focused to the laser medium, spaced apart from each other by one or a few millimeters. Of course, it is also possible to use two different laser diodes, but differences in output power and wavelength between different diodes may affect the power of the solid-state laser.

In the embodiment shown, the laser medium 2 is end-pumped via its one end face which is highly reflective for the wavelength of the laser, but highly transmitting for the pump wavelength. Thus, the end face constitutes the highly reflective mirror 4 for the two laser modes in the laser resonator. It is of course possible to use instead a separate highly reflective mirror 4 outside the laser medium.

The laser modes 10, 11 each have an output mirror 5, 6, and between them is a set of lenses 7 which depict the pump volumes on the output mirrors in such a manner that between the set of lenses and the mirrors the laser modes have largely planar phase fronts. The set of lenses 7 can be formed of one or more spherical lenses. The lenses must have extremely low absorption at the laser wavelength and should have an antireflection coating to have as small losses as possible.

At least one Fabry-Pérot etalon 3 is arranged between the set of lenses 7 and the output mirrors 5, 6, the planar phase fronts yielding small losses of diffraction. Since the laser modes 10, 11 have different angles of incidence to the etalon, it is possible to control the difference frequency between the laser modes by changing the angle between the etalon surface and the direction of propagation of the laser modes.

Instead of a set of lenses, a refracting prism 8 may be used. FIGS. 2a and 2b illustrate how the laser modes 10, 11 can be refracted towards or away from each other. All surfaces should have an antireflection coating or be mounted at the Brewster angle.

FIG. 3a illustrates a further embodiment having an intracavity prism 8. Here, the prism is in the shape of a rhomb. The angle of incidence of the laser modes 10, 11 to the surfaces adjacent to the laser medium is the Brewster angle of the prism and the other surfaces have a slightly smaller angle to each other such that the modes are refracted towards each other.

This geometry can also be used in a different manner. FIG. 3b shows a variant in which the laser medium 2 is in the shape of a rhomb and is pumped by means of two pump sources 1 from the opposite direction compared with the other embodiments in the Figures. The highly reflective mirror is, like before, designated 4, and the output mirrors are designated 5 and 6.

Another way of achieving the condition in which the different laser modes 10, 11 pass the Fabry-Pérot etalon 3 at different angles is shown in FIG. 4. Use is here made of a highly reflective spherical mirror 4 which together with the output mirrors 5, 6 define the different laser modes. The modes given by the radii of curvature of the mirrors intersect at a point. At this point the laser medium 2 is arranged. The laser can be pumped either sideways or through the highly reflective mirror, so-called end-pumping.

Since the laser modes 10, 11 overlap each other in the laser medium 2, they will be strongly coupled to each other. It may therefore be convenient to use orthogonally linear-polarised modes to prevent such coupling.

Also in this case, it is possible to design one end face of the laser medium 2 as the spherical highly reflective mirror surface 4.

If instead of a spherical, highly reflective mirror, use is made of a plane highly reflective mirror, the modes 10, 11 can be arranged side by side in the laser medium 2, in the same manner as in the case of intracavity elements. The modes can be parallel, diverging or converging in the laser medium.

FIGS. 5a and 5b illustrate a laser resonator having just one plane highly reflective mirror 4 for all the laser modes 10, 11. In the Figures, the mirror is arranged on one end face of the laser medium 2 but it may of course be a separate element. The opposite end face 9 of the laser medium is designed in such a manner that the laser modes are angled relative to each other. The Figures show how the end face 9 can be divided into partial faces which are angled relative to each other and, thus, can give the desired angle of the laser modes.

It is also possible to imagine that the highly reflective mirror 4 consists of a plane mirror surface for each laser mode 10, 11 and that these mirror surfaces form an angle with each other such that the directions of propagation of the laser modes become different. FIGS. 6a and 6b illustrate examples in this respect.

Below follows an example of a concrete choice of components included in a laser resonator of the invention and the construction thereof.

The laser medium 2 may consist of an yttrium-lithium-fluoride-crystal which is doped with thulium and holmium (Th, Ho:YLF), which results in the laser oscillating at a wavelength of 2.06 μm. The pump source 1 should then pump through the laser medium at a pump wavelength which is adapted to the absorption of the laser medium. In this case, at a wavelength of 0.792 μm.

The design and position of the output mirrors 5, 6 are determined by the desired design of the laser resonators. When using a plane highly reflective mirror 4, an output mirror having a radius of curvature is required for stable function. The radius of curvature is determined by the selected cavity length. The optical pumping results in amplification in the laser medium. The amplification then determines the amount of transmission in the output mirror for the laser wavelength 2.06 μm that is permitted for optimum function.

To achieve optimum function, it is also necessary that the other losses be minimised, i.e. all surfaces in the laser cavity (between the highly reflective mirror and an output mirror) except on the F-P etalon are provided with an antireflection coating for the laser wavelength.

The laser modes are given a mutual angle according to one of FIGS. 1–6. Knowing the angle of the laser modes, an F-P etalon can be mounted in the cavity at an angle to the main axis of the laser according to the equations which are stated below in this specification, such that the laser emits the desired frequencies.

In all the examples shown, there are two different laser modes 10, 11. However, there is nothing to prevent one from proceeding in the same manner with more laser modes. The laser modes can then still be separated in the plane of the Figures, i.e. along a line in a cross-section relative to the Figures, but it is of course also possible to use the third dimension, thereby dividing them into two dimensions over a cross-section relative to the Figures.

In the cases in which the modes 10, 11 do not overlap each other in the laser medium 2, it is possible to prevent the modes from affecting each other in the laser by making the laser medium with one part per laser mode, the parts being joined by a thermally conductive layer which is impermeable to laser radiation, for instance an indium foil, arranged between the parts.

Finally, for the sake of completeness, here follows a short mathematical description of the transmission properties of a Fabry-Pérot etalon 3. These are described by $$T = \frac{(1-R)^2}{(1-R)^2 + 4R\sin^2(\delta/2)},$$

wherein T is the transmission of the etalon and R is the reflection factor of the etalon surfaces. The phase factor δ is given by $$\delta = \frac{4\pi n d f \cos\phi}{c},$$

wherein n is the refractive index of the etalon, d is its thickness, f is the frequency of the radiation and φ represents the angle of incidence to the etalon 3 in FIG. 7.

The angle of incidence φ depends on the angle Φ of the etalon and the angle θ of the laser modes 10, 11 to the main axis 12 of the laser in FIG. 8.

$$\phi = \theta \pm \left(\frac{\pi}{2} - \Phi\right).$$

In the case in FIG. 4, the angle θ of the laser modes 10, 11 is given by the positions of the output mirrors 5, 6. With plane angled, highly reflective mirrors 4 according to FIGS. 6a and 6b, the angle of the modes is given by the angle of the highly reflective mirror relative to the main axis 12 of the laser and the refraction in the other surface 9 of the laser in which the angle of refraction is given by Snell's law.

With a fully plane highly reflective mirror and refraction in the other surface 9 of the laser in FIGS. 5a and 5b or with an intracavity element 7, 8 in FIGS. 1, 2a, 2b and 3, the angles are given by Snell's law.

I claim:

1. A laser resonator for at least two laser modes from an optically pumped laser medium, in which each laser mode is reflected between a highly-reflective mirror and an output mirror characterized in that the resonator feeds back and separates at least two longitudinal laser modes having a given stable frequency difference between the modes by the laser medium emitting the laser modes to pass a Fabry-Pérot etalon at different angles, the etalon located within said laser resonator.

2. The laser resonator according to claim 1, characterised in that the different laser modes, when leaving the laser medium, are essentially parallel, and that an optically refractive intracavity element is arranged to make them pass the Fabry-Pérot etalon at different angles.

3. The laser resonator according to claim 2, characterised in that the refractive element is a lens or a set of lenses.

4. The laser resonator according to claim 2, characterised in that the refractive element is a prism.

5. The laser resonator according to claim 1, characterised in that the different laser modes propagate linearly and non-parallel between the laser medium and the respective output mirrors.

6. The laser resonator according to claim 5, characterised in that the highly reflective mirror has a spherical surface and the different output mirrors are arranged such that the laser modes given by the radii of curvature of the mirrors intersect at a point at which the laser medium is positioned.

7. The laser resonator according to claim 5, characterised in that the highly reflective mirror consists of one planar surface for all the concerned laser modes and the surface of the laser medium facing away therefrom is designed in such a manner that the different laser modes become non-parallel.

8. The laser resonator according to claim 5, characterised in that the highly reflective mirror consists of a planar surface for each laser mode, said mirror surfaces being mutually angled relative to each other such that the different laser modes become non-parallel.

9. The laser resonator according to claim 1, characterised in that the highly reflective mirror is arranged on one end face of the laser medium.

10. The laser resonator according to claim 1, characterised in that the laser medium comprises one part per laser mode, said parts being joined by a thermally conductive layer which is impermeable to laser radiation.

11. A laser resonator comprising:

a laser medium emitting two laser modes that are reflected between a highly-reflective mirror and output mirrors; and a Fabry-Pérot etalon located between said highly-reflective mirror and said output mirrors, said etalon positioned to receive the laser modes at different angles and to introduce a stable frequency difference between the modes.

12. The laser resonator according to claim 11, characterized in that the different laser modes when leaving the laser medium are essentially parallel, and further comprising an optically refractive intracavity element arranged to make the different laser modes to pass the Fabry-Pérot etalon at different angles.

13. The laser resonator according to claim 11, characterized in that the different laser modes propagate linearly and non-parallel between the laser medium and the respective output mirrors.

14. The laser resonator according to claim 11, characterized in that the highly reflective mirror is arranged on an end face of the laser medium.

15. The laser resonator according to claim 11, characterized in that the laser medium comprises one part per laser mode, said parts being joined by a thermally conductive layer which is impermeable to laser radiation.

16. A laser resonator comprising:

a laser medium emitting two laser modes in parallel that are reflected between a highly-reflective mirror and output mirrors;

an optically refractive element receiving the parallel laser modes and outputting the laser modes at different angles; and, a Fabry-Pérot etalon located between said highly-reflective mirror and said output mirrors, said etalon positioned to receive the laser modes at different angles and to introduce a stable frequency difference between the modes.

* * * * *